(12) United States Patent
Iwamoto et al.

(10) Patent No.: US 11,431,437 B2
(45) Date of Patent: Aug. 30, 2022

(54) WIRELESS TRANSMITTING DEVICE, WIRELESS RECEIVING DEVICE, AND WIRELESS TRANSMITTING METHOD

(71) Applicant: YAMAHA CORPORATION, Hamamatsu (JP)

(72) Inventors: Shun Iwamoto, Fukuroi (JP); Hirokazu Suzuki, Hamamatsu (JP); Toshiyuki Sugawara, Kakegawa (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/064,078

(22) Filed: Oct. 6, 2020

(65) Prior Publication Data
US 2021/0105082 A1    Apr. 8, 2021

(30) Foreign Application Priority Data

Oct. 8, 2019   (JP) .............................. JP2019-185505

(51) Int. Cl.
*H04W 28/06*    (2009.01)
*H04L 1/00*    (2006.01)

(52) U.S. Cl.
CPC .......... *H04L 1/0003* (2013.01); *H04L 1/0006* (2013.01); *H04W 28/06* (2013.01)

(58) Field of Classification Search
None
See application file for complete search history.

(56) References Cited

U.S. PATENT DOCUMENTS

| 10,355,810 | B1* | 7/2019 | Muthuswamy | ....... H04L 1/0003 |
| 2014/0219088 | A1* | 8/2014 | Oyman | ............... H04L 65/1083 |
| | | | | 370/231 |
| 2015/0092645 | A1* | 4/2015 | Tabet | ................... H04L 1/1812 |
| | | | | 370/311 |
| 2016/0065994 | A1* | 3/2016 | Kokaska | ............ H04N 21/2365 |
| | | | | 375/240.26 |
| 2016/0277196 | A1 | 9/2016 | Jose | |
| 2018/0006753 | A1* | 1/2018 | Trainin | ................... H04L 27/18 |
| 2018/0007701 | A1* | 1/2018 | Adachi | ................ H04W 74/04 |
| 2019/0028671 | A1 | 1/2019 | Mobasher | |
| 2019/0097952 | A1* | 3/2019 | Yong | ................... H04L 47/2483 |

(Continued)

FOREIGN PATENT DOCUMENTS

JP    2018514752 A    6/2018

OTHER PUBLICATIONS

Extended European Search Report issued in European Appln. No. 20200314.1 dated Mar. 1, 2021.
(Continued)

*Primary Examiner* — Anh Vu H Ly
(74) *Attorney, Agent, or Firm* — Rossi, Kimms & McDowell LLP

(57) ABSTRACT

A wireless transmitting system acquires transmission data, sequentially transmits, by broadcast, a plurality of frames contained in the acquired transmission data, that are modulated by any of a plurality of modulation and coding schemes (MCSs) including a first MCS and a second MCS, and controls to transmit a first frame that is modulated by the first MCS based on the acquired transmission data and then to transmit a second frame that is modulated by the second MCS based on the acquired transmission data.

14 Claims, 14 Drawing Sheets

(56) References Cited

U.S. PATENT DOCUMENTS

2019/0182010 A1    6/2019  Dabbagh
2019/0222876 A1*   7/2019  Frecon, III ........... H04N 21/234

OTHER PUBLICATIONS

Mobasher. "Cross Layer Image Optimization (CLIO) for Wireless Video Transmission over 802.11ad Multi-Gigabit Channels." 2017 IEEE International Workshop Technical Committee on Communications Quality and Reliability (CQR). May 16, 2017: 1-6.
Office Action issued in Chinese Appln. No. 202011050922.5 dated Nov. 11, 2021. Computer English machine translation provided.

* cited by examiner

WIRELESS TRANSMITTING DEVICE, WIRELESS RECEIVING DEVICE, AND WIRELESS TRANSMITTING METHOD

CROSS-REFERENCE TO RELATED APPLICATION

The present application claims priority from Japanese application JP2019-185505 filed on Oct. 8, 2019, the content of which is hereby incorporated by reference into this application.

BACKGROUND

1. Technical Field

The present invention relates to a wireless transmitting device, a wireless receiving device, and a wireless transmitting method.

2. Description of the Related Art

Wireless LANs are used in various locations. In wireless LAN communication, broadcast packets including SSID and ARP are transmitted through a wireless LAN access point. The broadcast packets are sent to all wireless LAN clients. As such, data to be broadcast is generally modulated by a modulation method having the lowest transmission rate among a plurality of modulation methods defined in advance (referred to as MCSs), and transmitted to a wireless LAN client.

JP2018-514752A discloses measuring a distance between a plurality of wireless devices using broadcast messages sent by the wireless devices.

SUMMARY

With the diversification of network services, transmitting various types of content by broadcast is considered. At present, it is difficult to transmit a large amount of data in a short time by a modulation method with a low transmission rate, and a modulation method with a high transmission rate is likely to result in a case where a client cannot receive data.

One or more embodiments of the present invention have been conceived in view of the above, and an object thereof is to provide a technique that enables more appropriate data transmission through wireless LAN broadcast.

In order to solve the above described problems, a wireless transmitting device according to one embodiment of the present invention includes at least one memory device storing instructions and at least one processor. The at least one processor implements the instructions execute a plurality of tasks, including: an acquiring task that acquires transmission data; and a transmitting task that sequentially transmits, by broadcast, a plurality of frames contained in the acquired transmission data, that are modulated by any of a plurality of modulation and coding schemes (MCSs), including a first MCS and a second MCS, wherein the transmitting task transmits: a first frame that is modulated by the first MCS based on the acquired transmission data; and then a second frame that is modulated by the second MCS based on the acquired transmission data.

A wireless transmitting method using a wireless transmitting device according to one embodiment of the present invention includes acquiring transmission data; and sequentially transmitting, by broadcast, a plurality of frames, from the acquired transmission data, that are modulated by any of a plurality of modulation and coding schemes (MCSs), including a first MCS and a second MCS, wherein the sequentially transmitting transmits: a first frame that is modulated by the first MCS based on the acquired transmission data; and then a second frame that is modulated by the second MCS based on the acquired transmission data.

A wireless receiving device according to one embodiment of the present invention includes at least one memory device storing instructions; and at least one processor. The at least one processor implements the instructions to execute a plurality of tasks, including: a receiving task that receives a plurality of frames that are sequentially transmitted by broadcast via a transmitting device and are modulated by any of a plurality of modulation and coding schemes (MCSs), including a first MCS and a second MCS, based on transmission data acquired by the transmitting device; and an outputting task that outputs: the first frame after receiving the first frame modulated by the first MCS; and then the second frame after receiving the second frame modulated by the second MCS.

A wireless system according to one embodiment of the present invention includes at least one memory device storing instructions; and at least one processor. The at least one processor implements the instructions execute a plurality of tasks, including: an acquiring tasks that acquires transmission data; a transmitting task that sequentially transmits, by broadcast, a plurality of frames contained in the acquired transmission data, that are modulated by any of a plurality of modulation and coding schemes (MCSs), including a first MCS and a second MCS; a receiving task that receives the plurality of frames that are sequentially transmitted by the transmitting task; a storing task. The transmission task transmits a first frame that is modulated by the first MCS based on the acquired transmission data and then a second frame that is modulated by the second MCS based on the acquired transmission data. The storing task acquires, in a case where the first frame and the second frame after the first frame are received, the received data and stores the received data in a storage unit based on the received first frame.

Another wireless transmitting device according to one embodiment of the present invention includes at least one memory device storing instructions and at least one processor. The at least one processor implements the instructions execute a plurality of tasks, including: an acquiring task that acquires first transmission data and second transmission data that is different from the first transmission data; a transmitting task that sequentially transmits, by broadcast, a plurality of frames contained in the acquired transmission data, that are modulated by any of a plurality of modulation and coding schemes (MCSs) including a first MCS and a second MCS. The plurality of frames to be transmitted include a plurality of first frames in which the first transmission data is modulated by the first MCS and a plurality of second frames in which the second transmission data is modulated by the second MCS, and the second transmission data is different from the first transmission data.

According to the present invention, data can be transmitted more appropriately through wireless LAN broadcast.

DETAILED DESCRIPTION

An embodiment of the present invention will be described below with reference to the accompanying drawings. In the present embodiment, a wireless communication system for transmitting and receiving a plurality of frames using a plurality of modulation methods in the same frequency band will be described. Unless otherwise stated, the wireless communication system transmits and receives data in accordance with IEEE802 11.

First Embodiment

Figure 1:
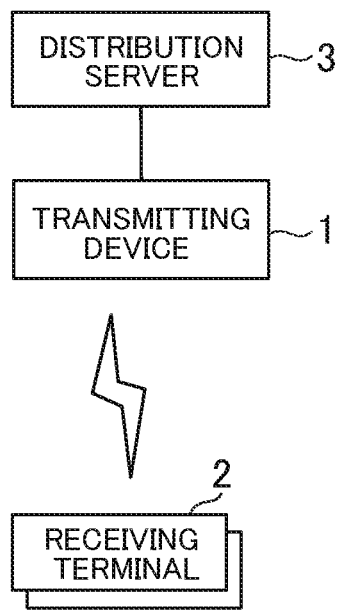
FIG. 1 is a diagram illustrating an example of a wireless communication system according to a first embodiment.

FIG. 1 is a diagram illustrating an example of a wireless communication system according to the present embodiment. The wireless communication system includes a transmitting device 1, one or more receiving terminals 2, and a distribution server 3. The transmitting device 1 is a wireless LAN access point, for example, and is a form of a wireless transmitting device capable of transmitting a plurality of frames in accordance with IEEE802 11. The frames include a plurality of broadcast frames. In particular, a wireless communication system that is effective when broadcast transmission is wirelessly performed will be described below.

Each of one or more receiving terminals 2 includes a wireless LAN client. The receiving terminal 2 is, for example, a personal computer or a smartphone, and can communicate with the wireless LAN access point in accordance with IEEE802 11. The receiving terminal 2 is a form of a wireless receiving device. The distribution server 3 stores transmission data to be transmitted by broadcast in a data source, and delivers the transmission data to the transmitting device 1. Here, the transmitting device 1 mainly transmits data, and the receiving terminal 2 receives the data, although the transmitting device 1 may receive the data, and the receiving terminal 2 may transmit the data.

Figure 2:
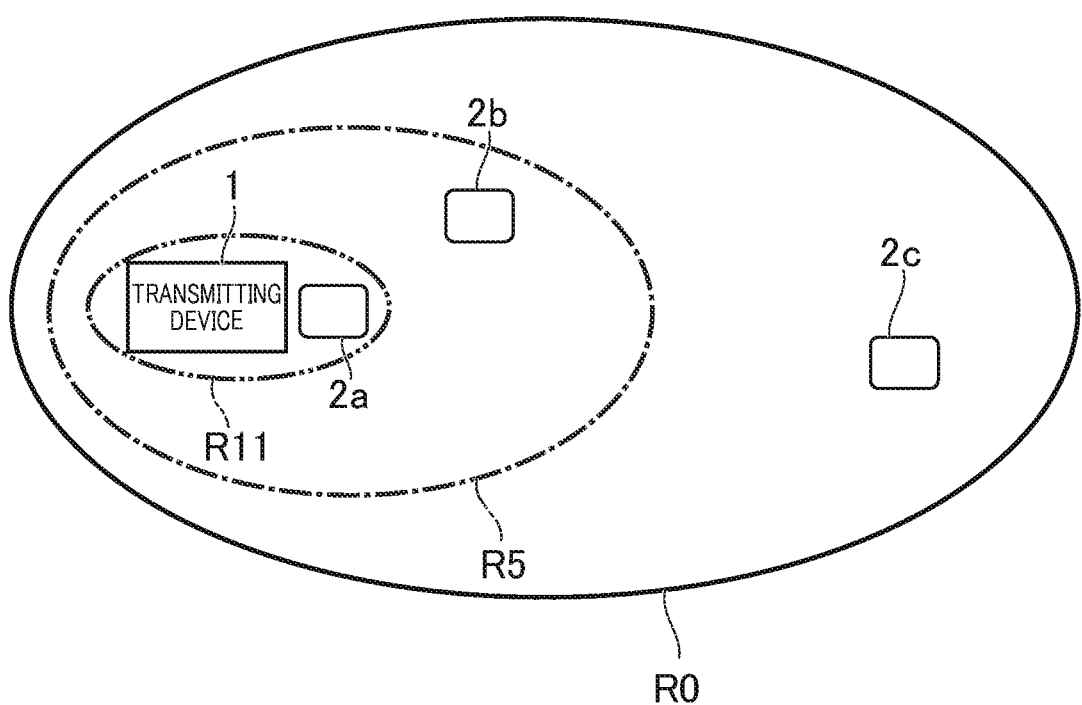
FIG. 2 is a diagram illustrating relationship between modulation methods and distributable areas.

FIG. 2 is a schematic diagram illustrating relationship between modulation methods and distributable areas. FIG. 2 shows the distributable areas R0, R5, and R11 when the transmitting device 1 transmits frames using the modulating methods MCS0, MCS5, and MCS11, respectively. MCS is an abbreviation for Modulation and Coding Scheme and defined by IEEE802.11. The distances between the transmitting device 1 and the edges of the distributable areas R0, R5, and R11 are about 100 m, 50 m, and 10 m, respectively. When the transmission rate by the modulation method is higher, the distributable area becomes narrower.

The receiving terminal 2a within the distributable area R11 can receive and demodulate the frame modulated by the MCS11, and can also receive and demodulate the frame modulated by other modulation methods. On the other hand, the receiving terminal 2b, which is outside the distributable area R11 and within the distributable area R5, is unable to receive the frame modulated by the MCS11, but can receive and demodulate the frame modulated by the MCS5 and the MCS0. The receiving terminal 2c outside the distributable area R5 and within the distributable area R0 cannot receive the frame modulated by the MCSs 11 and 5, but can receive and demodulate the frame modulated by the MCS0. As described above, the modulation method that enables the receiving terminal 2 to receive data may differ depending on the environment in which the receiving terminal 2 is located.

As shown in FIG. 2, depending on the modulation method, some receiving terminals 2 cannot receive data. On the other hand, if only a frame of a modulation method with a low transmission rate is used so that as many receiving terminals 2 as possible can receive a broadcast frame, the receiving terminal 2a near the transmitting device 1 takes longer to receive the broadcast frame than when receiving the broadcast frame with its original performance, for example. In the following, the configuration for more efficient broadcast transmission will be described in more detail.

Figure 3:
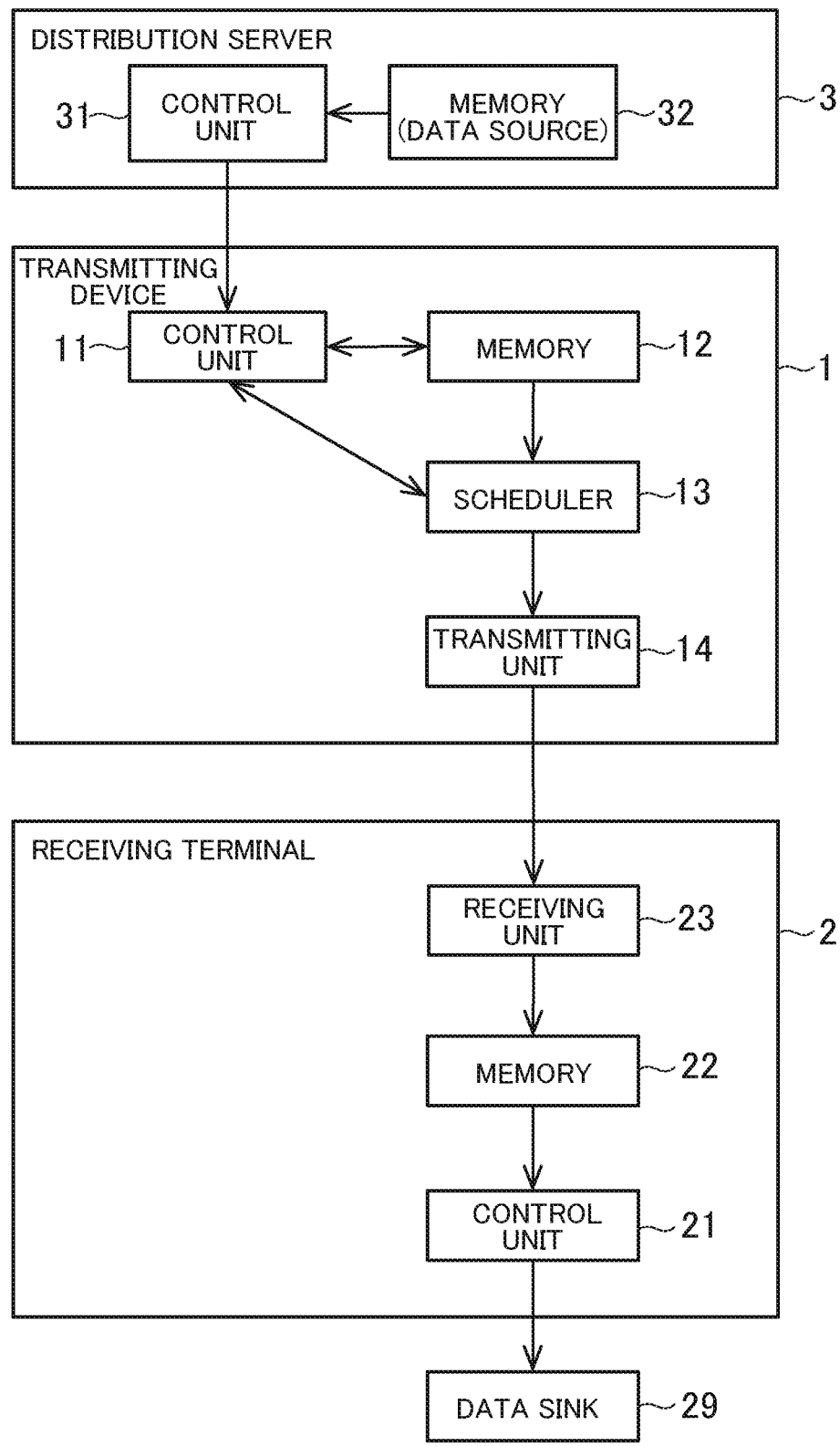
FIG. 3 is a block diagram showing an example of configurations of the transmitting device and the receiving terminal.
Figure 14:
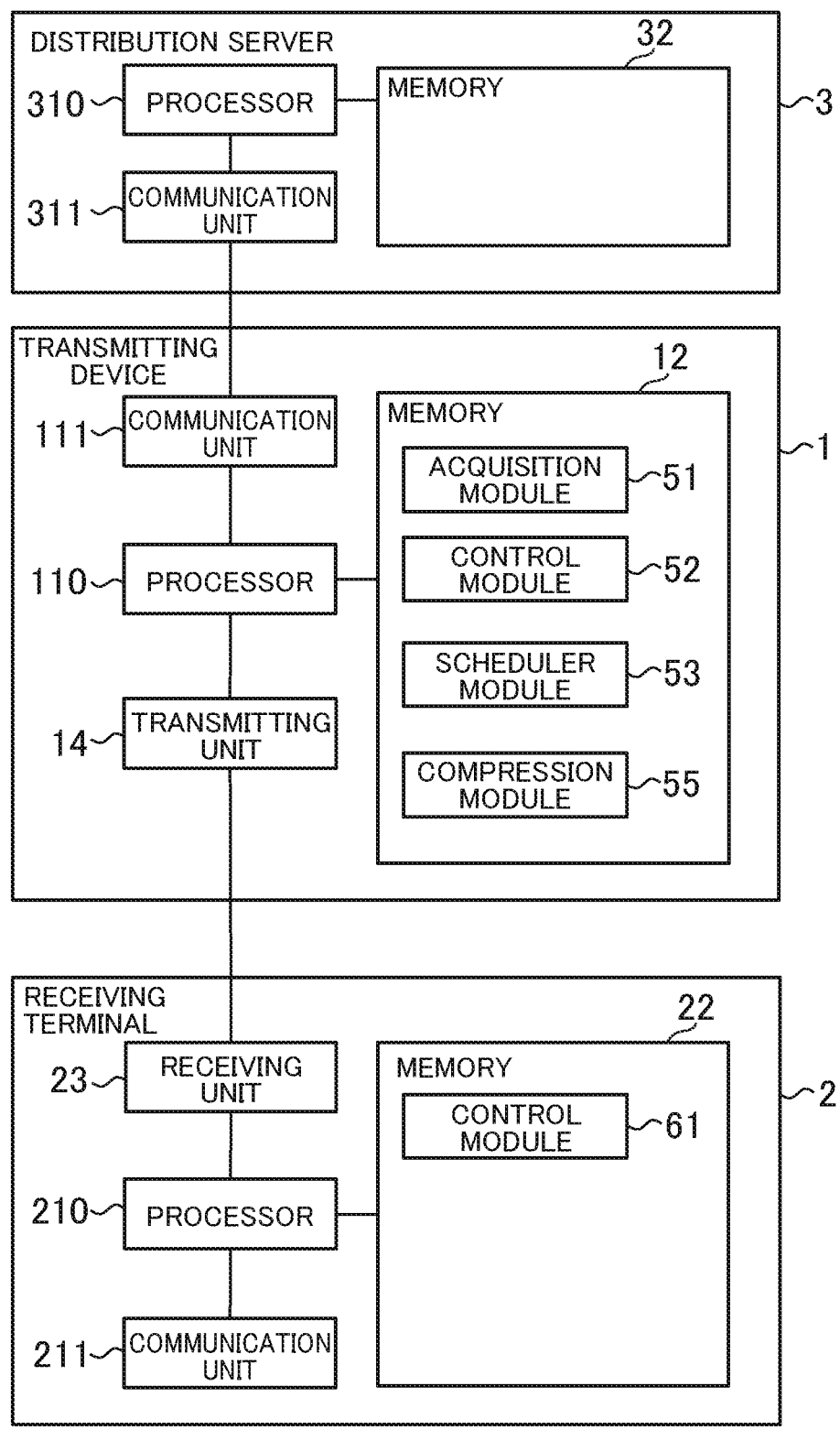
FIG. 14 is a block diagram showing an example of hardware configurations of a transmitting device, a receiving terminal, and a distribution server, and programs stored in memories.

FIG. 3 is a block diagram showing an example of the configurations of the transmitting device 1, the receiving terminal 2, and the distribution server 3. The transmitting device 1 includes a control unit 11, a memory 12, a scheduler 13, and a transmitting unit 14. The receiving terminal 2 includes a control unit 21, a memory 22, and a receiving unit 23. The distribution server 3 includes a control unit 31 and a memory 32. FIG. 14 is a block diagram showing an example of a hardware configuration of the transmitting device 1, the receiving terminal 2, and the distribution server 3, and programs stored in the memories 12 and 22.

The control units 11, 21, and 31 respectively include at least one processor 110, 210, and 310, and respectively include communication units 111, 211, and 311, which are hardware for wired communication interfaces.

The processors 110, 210, and 310 respectively included in the control units 11, 21, and 31 execute processing based on the programs respectively stored in the memories 12, 22, and 32. The control units 11, 21, and 31 may execute processing by dedicated hardware instead of at least some of the programs.

The memories 12, 22, and 32 include, for example, a volatile memory and a nonvolatile memory. The memory 12 of the transmitting device 1 can store the transmission data to be transmitted, and the memory 22 of the receiving terminal 2 can store the received data. The memory 32 of the distribution server 3 is also a data source and stores data to be transmitted. The memory 12 stores programs of an acquisition module 51, a control module 52, a scheduler module 53, and a compression module 55. The processor 110 may execute processing of the scheduler 13 by executing the scheduler module 53. The memory 22 stores the program of the control module 61. The memory 32 may store the program of the compression module 55.

The scheduler 13 reads the transmission data stored in the memory 12 under the control of the control unit 11 and delivers the read data to the transmitting unit 14. The transmitting unit 14 sequentially transmits a plurality of frames by wireless broadcasting. Each frame has a part of the transmission data. More specifically, the transmission data is internally divided into a plurality of sub-data pieces according to a size that can be stored in the frame, and each of the plurality of frames includes any of the sub-data pieces. The scheduler 13 reads the sub-data piece to be transmitted next from the memory 12, and delivers the data of the frame including the sub-data piece to the transmitting unit 14. The scheduler 13 may be the same processor as the one included in control unit 11 or may be hardware optimized for data transfer.

Transmitting unit 14 includes an antenna and a modulation circuit. The transmitting unit 14 modulates each of a plurality of frames by one of a plurality of modulation methods. The plurality of modulation methods are defined by IEEE802.11 standard and are called MCSs. For example, IEEE802.11ax has MCS0 to MCS11, the higher the numerical value, the higher the transmission rate.

In the present embodiment, the transmitting unit 14 may transmit the first frame modulated by the first modulation method, which is one of the plurality of modulation methods, based on one of the sub-data pieces (corresponding to a part of the transmission data), and then transmit the second frame modulated by the second modulation method, which is one of the modulation methods and is different from the first modulation method, based on the one of the sub-data pieces. By this transmission, the frames based on the same data are transmitted in a plurality of frames having different modulation methods. For the same sub-data piece, the frame by the modulation method with a high transmission rate is transmitted first.

The receiving unit 23 includes an antenna and a demodulation circuit. The receiving unit 23 receives a plurality of frames transmitted by the transmitting unit 14. The receiving unit 23 receives the frames regardless of the modulation methods of the respective frames, although the receiving unit 23 may receive only some of the modulation methods depending on the radio wave intensity. The receiving unit 23 demodulates the received frame. The data included in the demodulated frame is stored in the memory 22.

The receiving unit 23 of the receiving terminal 2 may receive frames including the same data (or data obtained by compressing the same data at different compression rates) for multiple times. In this case, the control unit 21 does not output duplicate data as a reception result. For example, in a case where the receiving unit 23 receives the first frame modulated by the first modulation method based on a part of the transmitted data, and then receives the second frame modulated by the second modulation method based on the part of the transmitted data, the control unit 21 outputs the data included in the first frame and discards the data included in the second frame by executing the program of the control module 61.

A data sink 29 stores data output by the control unit 21. The data sink 29 may be the memory 22 or a storage included in the receiving terminal 2, or an external computer. Based on the data stored in the data sink 29, content such as video and audio or a message is output, for example.

Figure 4:
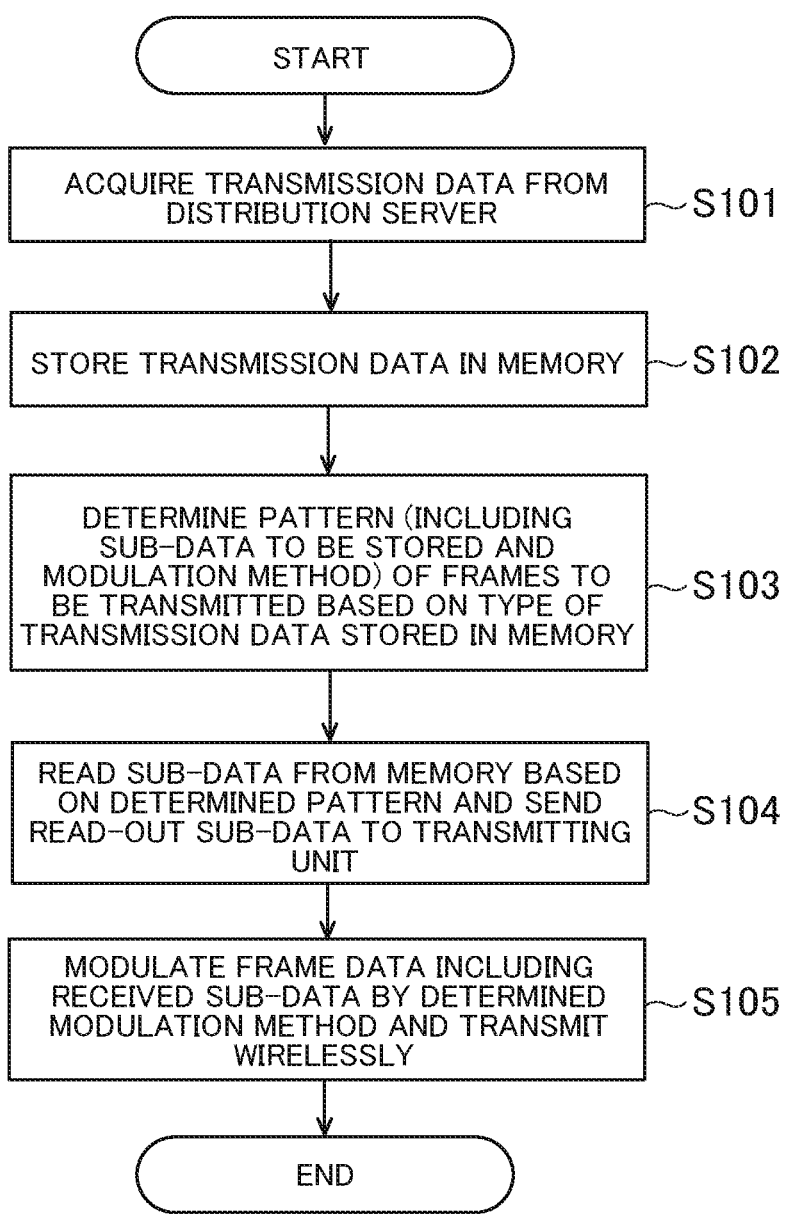
FIG. 4 is a flow chart for explaining processing of the transmitting device.

Next, the processing when the transmitting device 1 transmits the frame will be described in more detail. FIG. 4 is a flow chart for explaining the processing of the transmitting device 1. The control unit 11 acquires the transmission data from the data source of the distribution server 3 by executing the program of the acquisition module 51 (step S101). Here, the control unit 11 may acquire the transmission data by actively requesting the distribution server 3, or may acquire the transmission data by passively receiving the transmission data transmitted from the distribution server 3. Further, the control unit 11 may acquire the transmission data previously stored in the memory 12.

The control unit 11 stores the acquired transmission data in the memory 12 by executing the program of the acquisition module 51 (step S102). The memory 12 stores transmission data to be transmitted.

The transmission data is classified into various types. For example, types of the transmission data include streaming data and downloaded data, for example. The streaming data is data that requires immediacy, and the downloaded data is data of application programs or content that does not require immediacy, for example.

The control unit 11 determines a pattern of frames to be transmitted based on the type of the transmission data stored in the memory 12 by executing the program of the control module 52 (step S103). The pattern includes sub-data pieces to be respectively stored in the frames to be sequentially transmitted and the modulation method of each of the frames. In the case of broadcasting, the control unit 11 may select one of the plurality of patterns, or may constantly determine a predetermined pattern.

The pattern may be an instruction defining an operation of the scheduler 13 and the transmitting unit 14. For example, the pattern may be a modulation method of each of the frames transmitted in order, and information specifying a sub-data piece stored in each of the frames. Further, the information for specifying the sub-data piece may be information indicating a change in positions of the sub data piece stored in the a-th frame (a is an integer of 1 or more and less than b, b is the number of sub-data pieces) transmitted by a certain modulation method and the sub-data piece stored in the (a+1)-th frame transmitted by such a modulation method.

Based on the determined pattern, the scheduler 13 reads the sub-data piece from the memory 12 and sends the read-out sub-data piece to the transmitting unit 14 (step S104). Subsequently, the transmitting unit 14 modulates the frame data including the received sub-data piece using the modulation method determined as the pattern, and transmits the data wirelessly (step S105).

The transmitting device 1 transmits data using a plurality of modulation methods in accordance with the pattern determined by the control unit 11. With the use of the pattern corresponding to characteristics of data and a communication environment, for example, it is possible to transmit data more appropriately.

In the following, the pattern will be described in more detail. In the present embodiment, the control unit 11 controls the transmitting unit 14 to transmit the first frame modulated by the first modulation method, which is one of the plurality of modulation methods, based on one of the sub-data pieces (corresponding to a part of the transmission data), and then transmit the second frame modulated by the second modulation method, which is one of the modulation methods and is different from the first modulation method, based on the one of the sub-data pieces. Further, the first modulation method has faster transmission rate than the second modulation method.

In the following, a case where m modulation methods (i.e., three modulation methods of MCS11, MCS5, MCS0) are used will be described. The first modulation method (MCS11 in this case), the second modulation method (MCS5 in this case), and the m-th modulation method (MCS0 in this case) are defined in order of a transmission rate.

Figure 5:
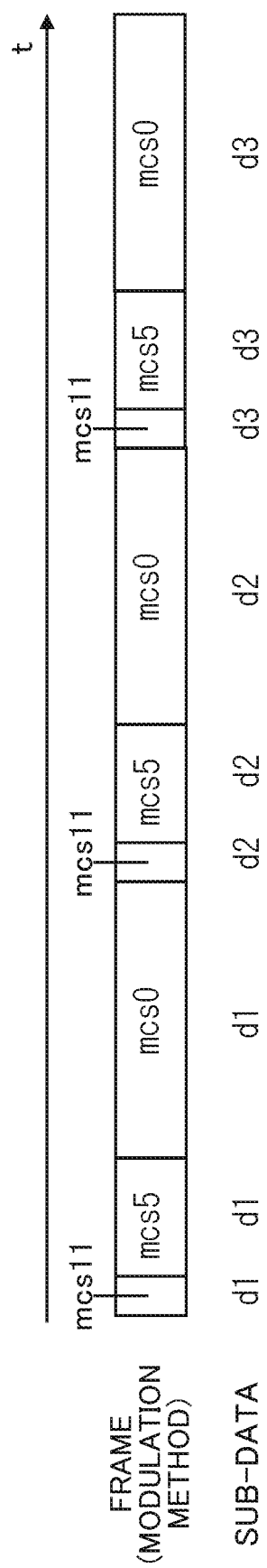
FIG. 5 is a diagram illustrating an example of a plurality of frames to be transmitted.

FIG. 5 is a diagram illustrating an example of a plurality of frames to be transmitted. In FIG. 5, a rectangular area indicated as a frame represents a period during which the frame is transmitted, and a character string in the rectangle represents a modulation method. The reference symbols of the sub-data pieces below the rectangular areas of the frames are information indicating the positions of the sub-data pieces in the original transmitted data stored in the frames. The frames may respectively include the reference symbols as sub-data identification information. The sub-data identification information is used in the receiving terminal 2. If the transmission data is downloaded data, the transmitting unit 14 may transmit a frame including the sub-data identification information.

In the pattern shown in FIG. 5, regarding a certain sub-data piece, the control unit 11 controls the transmitting unit 14 to repeat transmitting one frame of the first modulation method, one frame of the second modulation method, . . . , and one frame of the m-th modulation method in order, and regarding next piece of sub-data as well, transmitting a plurality of frames. More specifically, the control unit 11 controls the scheduler 13 to sequentially deliver the sub-data pieces from the memory 12 to the transmitting unit 14 based on the above-described pattern, and controls the transmitting unit 14 to transmit frames including the sub-data pieces sent by the modulation method corresponding to the pattern.

If the transmitting device 1 needs to reliably transmit data by broadcast to a receiving terminal 2 close to the transmitting device 1 but needs not to reliably transmit the data to a distant receiving terminal 2 (when a data type has high probability), the control unit 11 determines the pattern shown in FIG. 5 and controls the transmitting unit 14.

Figure 6:
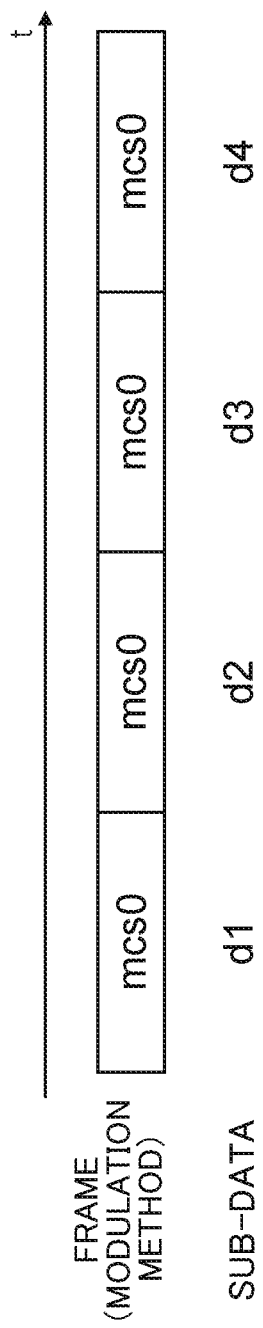
FIG. 6 is a diagram illustrating an example of comparison between a plurality of frames to be transmitted.

FIG. 6 is a diagram illustrating an example of comparison between a plurality of frames to be transmitted. FIG. 6 is an example of transmission of frames in a conventional broadcast. In the example of FIG. 6, the transmission rate is limited because broadcast data is transmitted only by the modulation method with the lowest transmission rate (MCS0 in this case). As such, compared with the example of FIG. 5, if a reception error occurs in the receiving terminal 2 close to the transmitting device 1, it is necessary to wait for a long time until the reception of the data fails or the data is transmitted again. In the example of FIG. 5, the same data is transmitted by the modulation method with a high transmission rate, and thus, the receiving terminal 2 close to the transmitting device 1 can reliably receive the data. Further, in the example of FIG. 5, for the same sub-data piece, the frame by the modulation method with a higher transmission rate is transmitted first, and thus the receiving terminal 2 close to the transmitting device 1 can receive the data earlier than a case where the data is transmitted in other orders.

Figure 7:
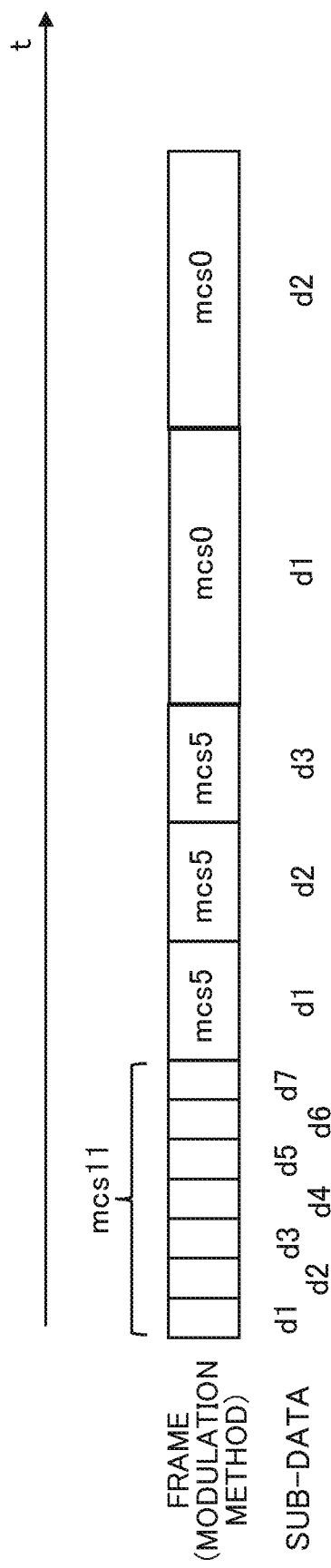
FIG. 7 is a diagram illustrating another example of a plurality of frames to be transmitted.

FIG. 7 is a diagram illustrating another example of a plurality of frames to be transmitted. In the pattern shown in FIG. 7, the control unit 11 controls the transmitting unit 14 to repeat transmitting successive F (1) frames of the first modulation method, successive F (2) frames of the second modulation method, . . . , successive F(m) frames of the m-th modulation method in order. Here, the condition of F (1)>F (2)> . . . >F(m) is satisfied. Regarding a plurality of frames transmitted by the same modulation method among all the frames transmitted by the transmitting unit 14, when a frame storing certain sub-data piece is transmitted, then a frame storing next sub-data piece is transmitted. The successive sub-data pieces are respectively stored in successive F (p) frames (p is an integer from 1 to m). The frame following the last frame shown in FIG. 7 including the eighth sub-data piece is modulated by the MCS11 and transmitted.

In the example of FIG. 7, data is transmitted in a shorter time in a modulation method with a high transmission rate. Accordingly, data of an application, for example, can be downloaded in a shorter time in the receiving terminal 2 close to the transmitting device 1. If the transmitting device 1 needs to transmit data in a short time by broadcast to a receiving terminal 2 close to the transmitting device 1 but may slowly transmit the data to a distant receiving terminal 2 (when a data type has high probability), the control unit 11 determines the pattern shown in FIG. 7 and controls the transmitting unit 14.

Figure 8:
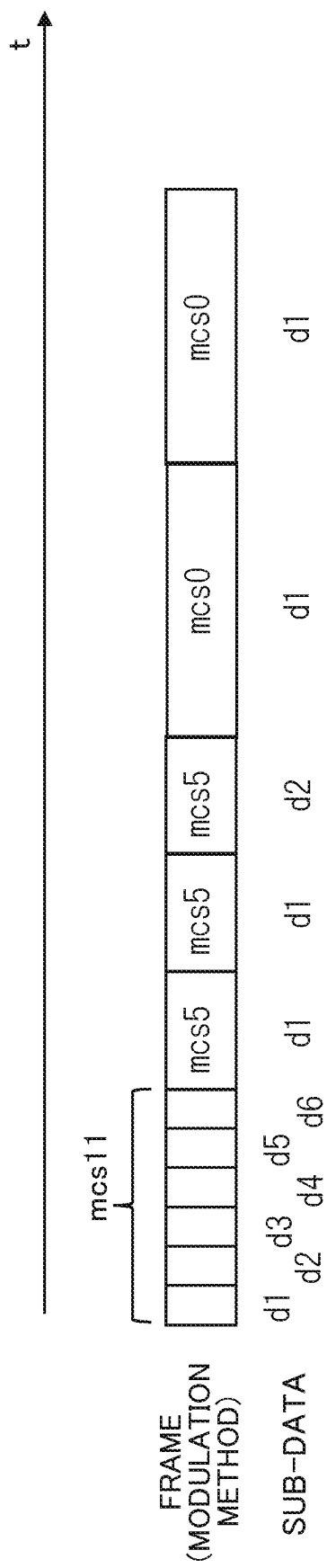
FIG. 8 is a diagram illustrating yet another example of a plurality of frames to be transmitted.

FIG. 8 is a diagram illustrating another example of a plurality of frames to be transmitted. In the pattern shown in FIG. 8, unlike the example of FIG. 7, a plurality of frames transmitted by the same modulation method among all the frames transmitted by the transmitting unit 14 include two consecutive frames storing the same sub-data piece. Further, the frames transmitted by the same modulation method include, after the two successive frames, another two successive frames storing the next sub-data piece. In the example of FIG. 8, frames of a certain sub-data piece are sequentially transmitted multiple times, it is possible to more reliably receive data even if an error occurs at the time of reception. If the transmitting device 1 needs to reliably transmit data to a receiving terminal 2 and also needs to send such data by broadcast in a short time to a receiving terminal 2 close to the transmitting device 1 (when a data type has high probability), the control unit 11 determines the pattern shown in FIG. 8 and controls the transmitting unit 14.

Figure 9:
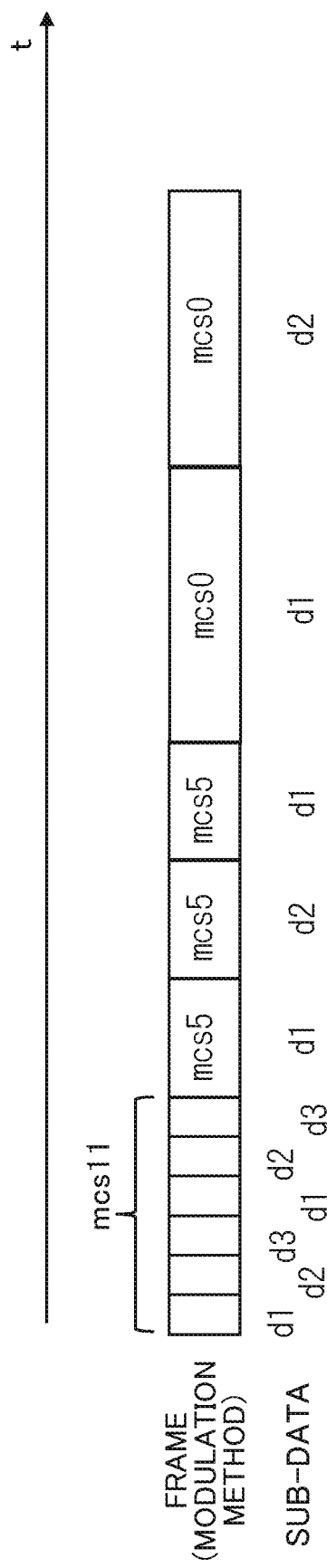
FIG. 9 is a diagram illustrating yet another example of a plurality of frames to be transmitted.

FIG. 9 is a diagram illustrating another example of a plurality of frames to be transmitted. In the pattern shown in FIG. 9, unlike the example of FIG. 7, a plurality of frames transmitted by the same modulation method among all the frames transmitted by the transmitting unit 14 include a plurality of sets each including two frames. Each set includes a frame in which k-th sub-data piece (k is an integer equal to or greater than 1 and less than n, n is an integer equal to or greater than 2) is stored, and a next frame in which (k+1)-th sub-data piece is stored. In this case, the k-th sub-data piece is modulated and transmitted by the first modulation method, and then the (k+1)-th sub-data piece is modulated and transmitted by the first modulation method. This processing is repeated (see MCS11 of FIG. 9), and after such repetition, the control unit 11 controls the transmitting unit 14 to transmit a frame in which the k-th sub-data is modulated by the second modulation method (see MCS5 of FIG. 9). In the example of FIG. 9 as well, similarly to the example of FIG. 8, it is possible to secure efficiency while more reliably receiving data. In the same case as in FIG. 8, the control unit 11 determines the pattern shown in FIG. 9 and controls the transmitting unit 14.

Figure 10:
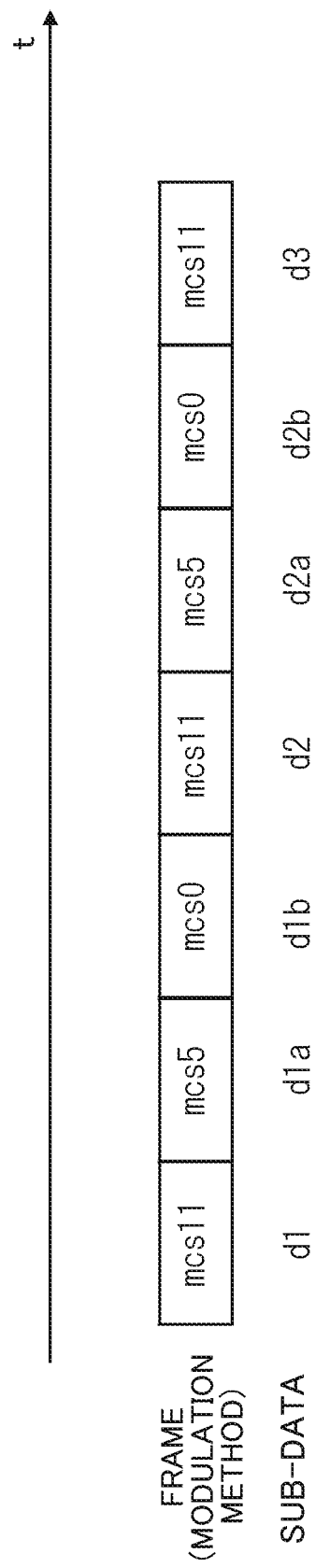
FIG. 10 is a diagram illustrating yet another example of a plurality of frames to be transmitted.

FIG. 10 is a diagram illustrating another example of a plurality of frames to be transmitted. In the example of FIG. 10, the transmitting unit 14 of the transmitting device 1 distributes video data by a plurality of modulation methods. The control unit 11 controls the transmitting unit 14 to transmit a first frame that includes a part of a first compressed data, in which the original transmission data is compressed, and is modulated by the first modulation method, and then transmit a second frame that includes second compressed data, in which the part of the transmission data is compressed in a different compression rate from the first compressed data, and is modulated by the second modulation method. Here, the first compressed data and the second compressed data are generated by the processor 110 executing a program of the compression module 55 and thereby compressing at least a part of the transmitted data, and are stored in the memory 12. The first compressed data and the second compressed data may be generated by the processor 310 of the distribution server 3 executing a program of the compression module 55, and the transmitting device may acquire the first compressed data and the second compressed data and store the data in the memory 12.

More specifically, in the example of FIG. 10, the sub-data pieces d1 and d2 are transmitted by the frames of the MCS11, the sub-data pieces d1a and d2a are transmitted by the frames of the MCS5, and the sub-data pieces d1b and d2b are transmitted by the frames of the MCS0. The sub-data pieces d1, d1a, and d2a are based on the same sub-data piece, and the sub-data pieces d2, d2a, and d2b are based on the same data. The data compressed from the original data is divided into sub-data pieces stored in respective frames. The frames storing the compressed sub-data piece generated based on the same sub-data piece may include the same sub-data identification information.

If the ratio of the sub-data piece stored in the i-th modulation method to the sub-data piece before compression is defined as a compression ratio C (i) (i is an integer of 1 to m), the condition of $1 \geq C(1) > C(2) > \ldots > C(m)$ is satisfied. In other words, when a frame of a modulation method has a slower transmission rate, data is more compressed. The compression executed here is lossy compression. Regarding a plurality of sub-data pieces in which equivalent parts of the original data are compressed, the control unit 11 controls the transmitting unit 14 to transmit a frame of a sub-data piece having a large compression ratio C (i), i.e., less compressed sub-data piece, before a frame of more compressed sub-data piece.

The control unit 11 determines a pattern shown in FIG. 10 when sending data that requires real-time performance and can be lossy-compressed, such as video data, by broadcast. In this pattern, the control unit 11 has encoders for the video data, compresses and encodes the video data stored in the memory 12 at a compression ratio C (i) according to the i-th modulation method, and divides the data into sub-data pieces of appropriate sizes. The compressed encoding may be performed by the control unit 31 of the distribution server 3.

As a result, for example, when the video data is transmitted by broadcast, the receiving terminal 2 close to the transmitting device 1 can output a high-quality image based on more amount of data.

Figure 11:
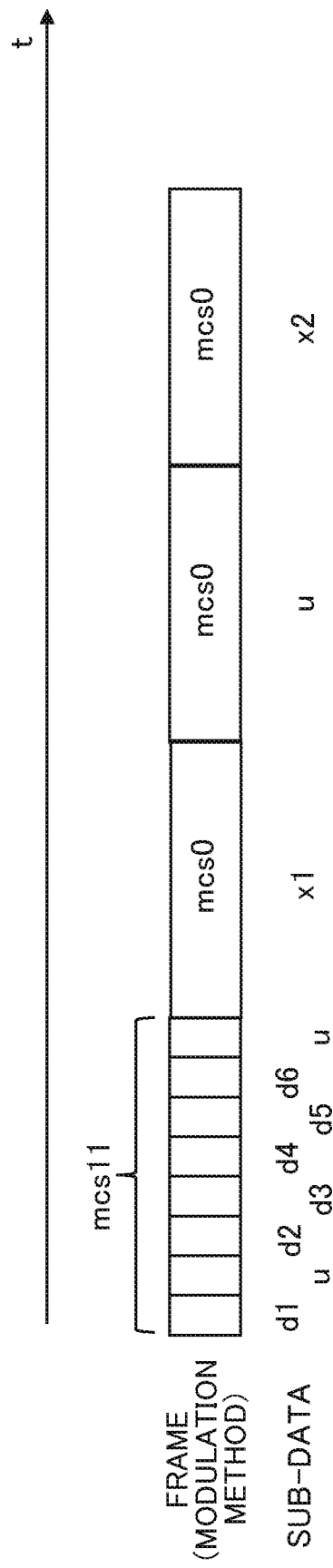
FIG. 11 is a diagram illustrating an example of a plurality of frames to be transmitted.

The transmitting unit 14 of the transmitting device 1 may transmit a mixture of broadcast frames and unicast frames. FIG. 11 is a diagram illustrating an example of a plurality of frames to be transmitted. In the example of FIG. 11, the transmitting unit 14 transmits a mixture of frames including unicast sub-data piece u and frames including broadcast sub-data pieces d1 to d6, x1, and x2.

Figure 12:
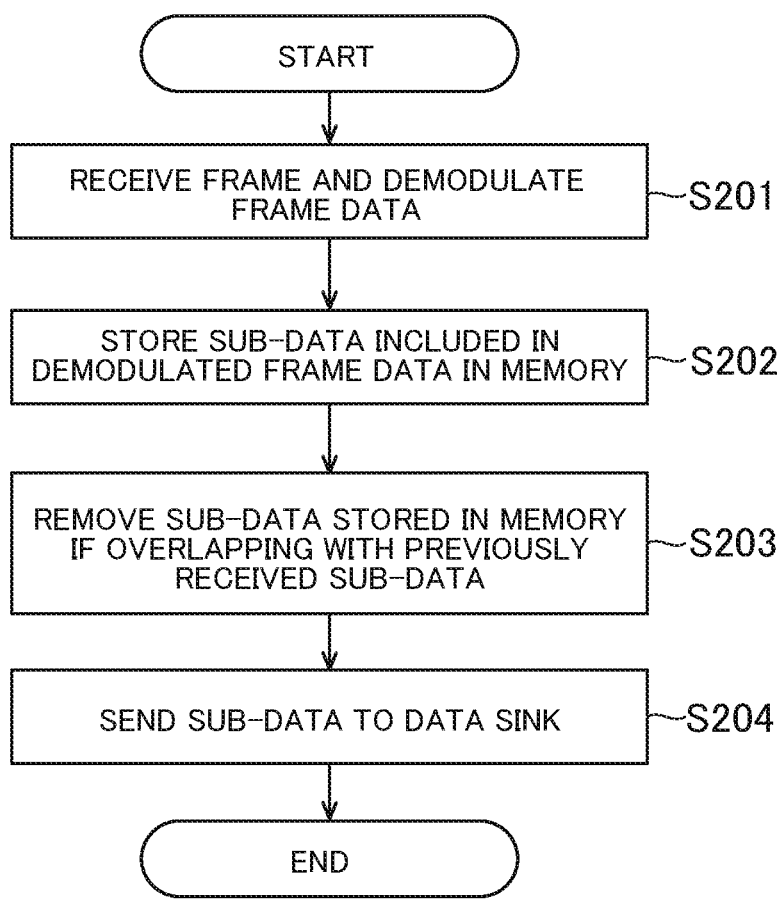
FIG. 12 is a flow chart for explaining processing of the receiving terminal.

Next, the processing when the receiving terminal 2 receives a frame will be described in more detail. FIG. 12 is a flow chart for explaining the processing of the receiving terminal 2. The processing shown in FIG. 12 is executed each time the receiving unit 23 of the receiving terminal 2 receives a frame.

The receiving unit 23 receives a frame transmitted from the transmitting unit 14, and demodulates frame data included in the frame (step S201). The receiving unit 23 stores a sub-data piece included in the demodulated frame data in the memory 22 (step S202). Here, the receiving unit 23 may send the demodulated frame data to the control unit 21, and the control unit 21 may store the frame data in the memory 22.

The control unit 21 outputs, to the data sink 29, only a sub-data piece that does not overlap with a previously received sub-data piece among the sub-data pieces demodulated by the transmitting unit 14. More specifically, among the sub-data pieces stored in the memory 22, the control unit 21 removes a sub-data piece that overlaps with a previously received sub-data piece (step S203). More specifically, if the sub-data identification information of the sub-data piece already received is the same as the sub-data identification information of the sub-data piece received thereafter, the control unit 21 may remove the sub-data piece received later as being overlapped.

The control unit 21 outputs the sub-data piece that is not removed to the data sink 29 (step S204). If the data sink 29 is included in the receiving terminal 2 and used by the application program, the control unit 21 may store the sub-data piece in an area of the memory 22 accessed by the application program. If the data sink 29 is included in an external computer, the control unit 21 may transmit the sub-data piece to the external computer.

In the example of FIG. 10, if the parts of the data before compression substantially overlap, the sub-data identification information is the same even if the compression ratios are different, and the more uncompressed sub-data piece is sent first. Specifically, the transmitting device 1 sequentially transmits the first frame in which the first compressed data in which a part of transmission data is compressed is modulated by the first modulation method and the second frame in which the second compressed data, a part of which is more compressed than the first compressed data, is modulated by the second modulation method. When the receiving unit 23 receives the first frame and the second frame, the control unit 21 outputs, to the data sink 29, the first compressed data demodulated from the first frame that is received by the receiving unit 23 first, and does not output the second compressed data demodulated from the second frame. This enables the receiving terminal 2 in a better reception environment to output more uncompressed data in a simpler form.

Second Embodiment

In the first embodiment, the transmitting device 1 transmits the same data or the data based on the same data by a plurality of modulation methods. In the second embodiment, different pieces of data are modulated by a plurality of modulation methods and transmitted by broadcast. In the following, differences from the first embodiment will be mainly described. The transmitting device 1 also includes the control unit 11, the memory 12, the scheduler 13, and the transmitting unit 14, and thus the descriptions thereof are omitted. In addition, the configuration of the receiving terminal 2 is not greatly different from the first embodiment, and thus the description thereof will be omitted.

In the second embodiment, the control unit 11 acquires the first transmission data from the distribution server 3 and the second transmission data that is different from the first transmission data, and stores the acquired data in the memory 12.

Further, the control unit 11 controls such that a plurality of frames transmitted by the transmitting unit 14 include a plurality of first frames in which the first transmission data is modulated by the first modulation method and a plurality of second frames in which the second transmission data is modulated by the second modulation method.

Figure 13:
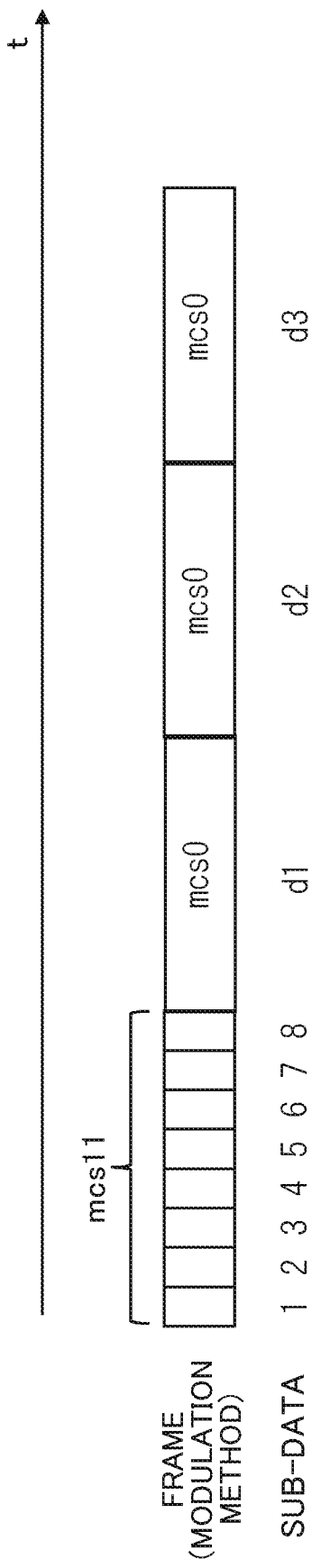
FIG. 13 is a diagram illustrating an example of a plurality of frames to be transmitted in a second embodiment.

FIG. 13 is a diagram illustrating an example of a plurality of frames to be transmitted in the second embodiment. The example of FIG. 13 shows sub-data pieces 1 to 8 of the first transmission data transmitted by the MCS11, which is a modulation method with a high transmission rate, and sub-data pieces d1 to d3 of the second transmission data subsequently transmitted by the MCS0, which is a modulation method with a low transmission rate. For example, if the transmitting device 1 is located in a museum, the first data may be video content introducing exhibits in the vicinity of the transmitting device 1, and the second data may be data of text content introducing exhibits in the vicinity of the transmitting device 1. The modulation methods are varied according to the characteristic of the data to be transmitted by broadcast, which serves to transmit data more efficiently.

What is claimed is:

1. A wireless transmitting device comprising:
at least one memory device storing instructions;
at least one processor that implements the instructions to execute a plurality of tasks, including:
an acquiring task that acquires transmission data containing a plurality of frames, including a first frame and a second frame; and
a transmitting task that sequentially transmits, by broadcast, the plurality of frames contained in the acquired transmission data, that are modulated by any of a plurality of modulation and coding schemes (MCSs), including a first MCS and a second MCS, wherein the transmitting task transmits:
the first frame that is modulated by the first MCS based on the acquired transmission data; and
the second frame that is modulated by the second MCS based on the acquired transmission data after transmitting the first frame,
wherein the first frame and the second frame include common data contained in the acquired transmission data,
wherein the acquired transmission data is divided into a plurality of sub-data pieces, including a first sub-data piece and a second sub-data piece,
wherein the first frame includes the first sub-data piece,
wherein the second frame includes the second sub-data piece,
wherein the plurality of frames include a third frame including the second sub-data piece, and
wherein the transmitting task transmits, after transmitting the first frame, the third frame modulated by the first MCS before transmitting the second frame.

2. The wireless transmitting device according to claim 1, wherein each of the plurality of MCSs is defined by IEEE802.11.

3. The wireless transmitting device according to claim 1, wherein a transmission rate of the first MCS is faster than a transmission rate of the second MCS.

4. A wireless transmitting device comprising:
at least one memory device storing instructions;
at least one processor that implements the instructions to execute a plurality of tasks, including:
an acquiring task that acquires transmission data containing a plurality of frames, including a first frame and a second frame; and
a transmitting task that sequentially transmits, by broadcast, the plurality of frames contained in the acquired transmission data, that are modulated by any of a plurality of modulation and coding schemes (MCSs), including a first MCS and a second MCS, wherein the transmitting task transmits:
the first frame that is modulated by the first MCS based on the acquired transmission data; and
the second frame that is modulated by the second MCS based on the acquired transmission data after transmitting the first frame,
wherein the first frame and the second frame include common data contained in the acquired transmission data,
wherein the acquired transmission data is divided into a plurality of sub-data pieces, including a first sub-data piece and a second sub-data piece,
wherein the first frame includes the first sub-data piece,
wherein the second frame includes the second sub-data piece,
wherein the plurality of frames include a third frame including the first sub-data piece, and
wherein the transmitting task transmits the third frame modulated by the first MCS.

5. A wireless transmitting device comprising:
at least one memory device storing instructions;
at least one processor that implements the instructions to execute a plurality of tasks, including:
an acquiring task that acquires transmission data containing a plurality of frames, including a first frame and a second frame; and
a transmitting task that sequentially transmits, by broadcast, the plurality of frames contained in the acquired transmission data, that are modulated by any of a plurality of modulation and coding schemes (MCSs), including a first MCS and a second MCS, wherein the transmitting task transmits:
the first frame that is modulated by the first MCS based on the acquired transmission data; and
the second frame that is modulated by the second MCS based on the acquired transmission data after transmitting the first frame,
wherein the first frame and the second frame include common data contained in the acquired transmission data,
wherein the acquired transmission data is divided into a plurality of sub-data pieces, and
wherein the transmitting task repeats transmitting of:
a frame including a k-th sub-data piece, among the plurality of sub-data pieces, where k is an integer greater than or equal to 1 and less than n, which is an integer greater than or equal to 2, modulated by the first MCS; then
a frame including a (k+1)-th sub-data piece, among the plurality of sub-data pieces, modulated by the first MCS; and then
the frame including the k-th sub-data piece modulated by the second MCS.

6. The wireless transmitting device according to claim 1, wherein the plurality of frames each include information indicating a position of a corresponding sub-data piece, among the plurality of sub-data pieces, included therein.

7. The wireless transmitting device according to claim 6, wherein:
the transmission data is either streaming data or downloaded data, and
the transmission task, in a case where the transmission data is downloaded data, transmits a frame, among the plurality of frames, including the information about the position of the corresponding sub-data piece.

8. The wireless transmitting device according to claim 1, wherein each of the first and second MCS is defined by IEEE802.11.

9. A wireless receiving device comprising:
at least one memory device storing instructions; and
at least one processor that implements the instructions to execute a plurality of tasks, including:
a receiving task that receives a plurality of frames, including a first frame and a second frame, that are sequentially transmitted by broadcast via a transmitting device and are modulated by any of a plurality of modulation and coding schemes (MCSs), including a first MCS and a second MCS, based on transmission data acquired by the transmitting device; and
an outputting task that outputs the first frame after receiving the first frame modulated by the first MCS while not outputting the second frame after receiving the second frame modulated by the second MCS,
wherein the transmission data acquired by the transmitting device includes first compressed data and second compressed data that is more compressed than the first compressed data,
wherein the first frame includes the first compressed data,
wherein the second frame includes the second compressed data, and
wherein the outputting task, after the receiving task receives the first frame and the second frame after the first frame, demodulates the first compressed data and outputs the first frame, and demodulates the second compressed data while not outputting the second frame.

10. A wireless transmitting method implemented by a wireless transmitting device, the method comprising:
acquiring transmission data containing a plurality of frames, including a first frame and a second frame; and
sequentially transmitting, by broadcast, the plurality of frames contained in the acquired transmission data, that are modulated by any of a plurality of modulation and coding schemes (MCSs), including a first MCS and a second MCS, wherein the sequentially transmitting transmits:
the first frame that is modulated by the first MCS based on the acquired transmission data; and
the second frame that is modulated by the second MCS based on the acquired transmission data after transmitting the first frame,
wherein the first frame and the second frame include common data contained in the acquired transmission data,
wherein the acquired transmission data is divided into a plurality of sub-data pieces, including a first sub-data piece and a second sub-data piece,
wherein the first frame includes the first sub-data piece,
wherein the second frame includes the second sub-data piece,
wherein the plurality of frames include a third frame including the second sub-data piece, and
wherein the sequentially transmitting, after transmitting the first frame, transmits the third frame modulated by the first MCS before transmitting the second frame.

11. The wireless transmitting method according to claim 10, wherein each of the plurality of MCSs is defined by IEEE802.11.

12. The wireless transmitting method according to claim 10, wherein a transmission rate of the first MCS is higher than a transmission rate of the second MCS.

13. A wireless transmitting method implemented by a wireless transmitting device, the method comprising:
acquiring transmission data containing a plurality of frames, including a first frame and a second frame; and
sequentially transmitting, by broadcast, the plurality of frames contained in the acquired transmission data, that are modulated by any of a plurality of modulation and coding schemes (MCSs), including a first MCS and a second MCS, wherein the sequentially transmitting transmits:
the first frame that is modulated by the first MCS based on the acquired transmission data; and
the second frame that is modulated by the second MCS based on the acquired transmission data after transmitting the first frame,
wherein the first frame and the second frame include common data contained in the acquired transmission data,
wherein the acquired transmission data is divided into a plurality of sub-data pieces, including a first sub-data piece and a second sub-data piece,
wherein the first frame includes the first sub-data piece,
wherein the second frame includes the second sub-data piece,
wherein the plurality of frames include a third frame including the first sub-data piece, and
wherein the sequentially transmitting transmits the third frame modulated by the first MCS.

14. A wireless transmitting method implemented by a wireless transmitting device, the method comprising:
acquiring transmission data containing a plurality of frames, including a first frame and a second frame; and
sequentially transmitting, by broadcast, the plurality of frames contained in the acquired transmission data, that are modulated by any of a plurality of modulation and coding schemes (MCSs), including a first MCS and a second MCS, wherein the sequentially transmitting transmits:
the first frame that is modulated by the first MCS based on the acquired transmission data; and
the second frame that is modulated by the second MCS based on the acquired transmission data after transmitting the first frame,
wherein the first frame and the second frame include common data contained in the acquired transmission data,
wherein the acquired transmission data is divided into a plurality of sub-data pieces, and
wherein the sequentially transmitting repeats transmitting of:
a frame including a k-th sub-data piece, among the plurality of sub-data pieces, where k is an integer greater than or equal to 1 and less than n, which is an integer greater than or equal to 2, modulated by the first MCS; then
a frame including a (k+1)-th sub-data piece, among the plurality of sub-data pieces, modulated by the first MCS; and then the frame including the k-th sub-data piece modulated by the second MCS.

* * * * *